W. A. BESSERDICH.
STEERING GEAR.
APPLICATION FILED MAY 29, 1913.

1,094,297.  Patented Apr. 21, 1914.

Witnesses
Inventor
W. A. Besserdich
By W. J. Fitzgerald Co.
Attorney

UNITED STATES PATENT OFFICE.

WILLIAM A. BESSERDICH, OF CLINTONVILLE, WISCONSIN.

STEERING-GEAR.

1,094,297. Specification of Letters Patent. Patented Apr. 21, 1914.

Application filed May 29, 1913. Serial No. 770,773.

*To all whom it may concern:*

Be it known that I, WILLIAM A. BESSERDICH, a citizen of the United States, residing at Clintonville, in the county of Waupaca and State of Wisconsin, have invented certain new and useful Improvements in Steering-Gears; and I do hereby declare the following to be a full, clear, and exact description of the invention, such as will enable others skilled in the art to which it appertains to make and use the same.

This invention relates to improved steering gears especially adapted for automobiles, but not necessarily limited to such use.

An object of the invention is the provision of a steering gear of simple and inexpensive construction, and having means for positively preventing accidental shifting of the steering adjustment ordinarily caused by the steering wheel striking obstructions in the road.

Figure 1:
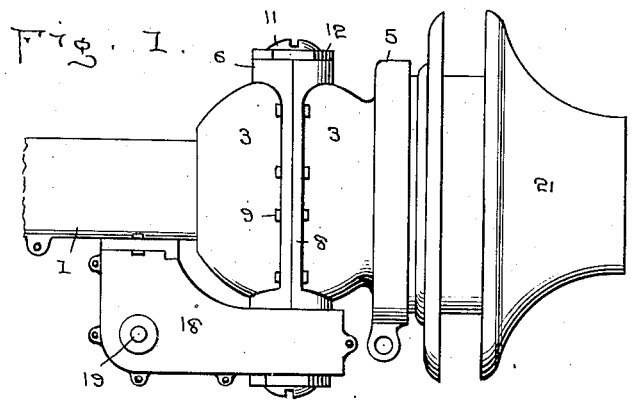
Figure 2:
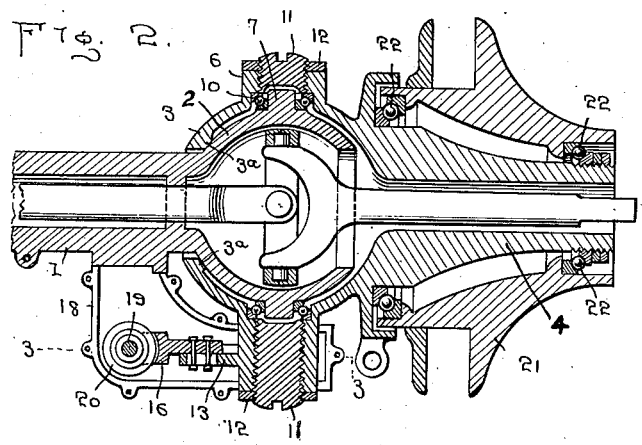
Figure 3:
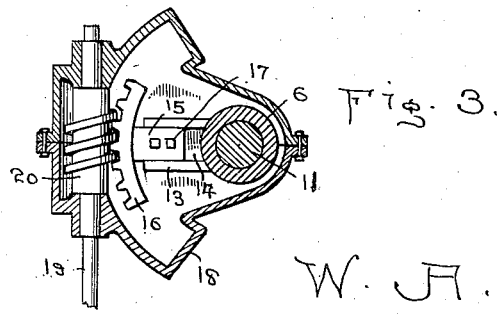

In the accompanying drawing wherein is shown a preferred embodiment of my invention, Figure 1 represents a side elevation of the steering gear and hub. Fig. 2 represents a vertical sectional view therethrough, and, Fig. 3 represents a sectional view on the line 3—3 of Fig. 2.

Referring to the drawing in detail, wherein similar reference characters designate corresponding parts throughout the several views, 1 indicates a hollow casing having formed at the opposite ends thereof, hollow heads 2 substantially spherical in shape and communicating with the hollow casing 1, whereby the device is adaptable for a front driving axle in the case that the steering gear is to be applied upon a four wheel drive vehicle. The hollow head 2 is inclosed by the socket portion 3 preferably formed integral with the skein member 4, having the hub protecting flange 5 thereon. At the top and bottom of the socket 3 are formed apertured bosses 6 which rotatably receive the vertically disposed trunnions 7 of the head 2. At the inner open end of the socket 3 is formed an annular flange or enlargement 3ᵃ which is adapted to contact the surface of the head 2 and exclude dust from the joint or knuckle formed by the head and socket.

The socket 3 is preferably formed in two parts whereby the gear may be conveniently assembled, and for securing the parts of the socket together, suitable flanges 8 are formed thereon to receive bolts 9 or other securing devices.

Friction reducing devices 10 are disposed between the trunnions 7 and the apertured bosses 6, and are adjustably held in operative position by the adjusting screws 11 threaded within the apertured bosses 6 and securely held in adjusted position by the lock nuts 12.

The lower apertured boss 6 is provided with an inwardly extending arm 13 having a slot 14 therein for receiving the shank 15 of the worm segment 16. The arm 13 and shank 15 are adjustably secured together by means of bolts 17. A two-part housing 18 incloses the parts 13 and 16 and is of the proper shape and size to permit the latter to oscillate freely. The end of the housing 18 adjacent the worm segment 16 is provided with openings for receiving the shaft 19 which may be connected exteriorly of the housing 18 by suitable connections with the steering wheel of the vehicle. Within the housing 18 the shaft 19 is provided with a worm 20 which meshes with the worm segment 16 and is adapted to actuate the latter to adjust the socket 3 together with the skein member 4, as will be understood. A preferred form of hub 21 is mounted over the skein member 4 and is spaced therefrom by suitable friction reducing devices 22.

What I claim is:—

1. A steering gear comprising a casing having a hollow head at the ends thereof and vertically alined trunnions on said heads, a two-part socket rotatable on said trunnions and having a skein member integral with one of the parts thereof, an arm carried by said socket, a worm segment secured to said arm, a worm meshing with said worm segment, and a housing inclosing said worm and said worm segment.

2. A steering gear comprising a casing having hollow heads at the ends thereof and vertically alined trunnions on said heads, a two-part socket rotatable on said trunnions and having a skein member integral with one of the parts thereof, an arm carried by said socket, a worm segment adjustably secured to said arm, a worm meshing with said worm segment, and a housing inclosing said worm and said worm segment.

3. A steering gear comprising a casing having a hollow head at the end thereof and vertically alined trunnions on said head, a two part socket rotatable on said trunnions and having a skein member integral with one of the parts thereof, an arm carried by said socket, an adjustable worm segment secured to said arm, a two part housing, and a worm rotatable in said housing and meshing with said worm segment.

In testimony whereof I have signed my name to this specification in the presence of two subscribing witnesses.

WILLIAM A. BESSERDICH.

Witnesses:
 LEVI C. LARSON,
 MAX OLIEG.